United States Patent
Choi et al.

(10) Patent No.: US 10,497,911 B2
(45) Date of Patent: Dec. 3, 2019

(54) BATTERY MODULE, BATTERY PACK INCLUDING BATTERY MODULE, AND AUTOMOBILE INCLUDING BATTERY PACK

(71) Applicant: LG CHEM, LTD., Seoul (KR)

(72) Inventors: Yang-Kyu Choi, Daejeon (KR); Seong-Tae Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 122 days.

(21) Appl. No.: 15/573,626

(22) PCT Filed: Jul. 11, 2016

(86) PCT No.: PCT/KR2016/007528
§ 371 (c)(1),
(2) Date: Nov. 13, 2017

(87) PCT Pub. No.: WO2017/030290
PCT Pub. Date: Feb. 23, 2017

(65) Prior Publication Data
US 2018/0138474 A1 May 17, 2018

(30) Foreign Application Priority Data
Aug. 19, 2015 (KR) .................. 10-2015-0116712

(51) Int. Cl.
*H01M 2/10* (2006.01)
*H01M 10/04* (2006.01)

(52) U.S. Cl.
CPC ..... *H01M 2/1077* (2013.01); *H01M 10/0413* (2013.01); *H01M 2220/20* (2013.01)

(58) Field of Classification Search
CPC ........... H01M 2/1077; H01M 10/0413; H01M 2220/20
See application file for complete search history.

(56) References Cited

U.S. PATENT DOCUMENTS 4,478,337 A * 10/1984 Flum ................... A47F 1/12
206/564
8,512,889 B1 8/2013 Ahn
(Continued)

FOREIGN PATENT DOCUMENTS

| JP | 2012-164431 A | 8/2012 |
| JP | 2012-181970 A | 9/2012 |

(Continued)

OTHER PUBLICATIONS

International Search Report issued in PCT/KR2016/007528 (PCT/ISA/210), dated Oct. 21, 2016.

*Primary Examiner* — Michael L Dignan
(74) *Attorney, Agent, or Firm* — Birch, Stewart, Kolasch & Birch, LLP

(57) ABSTRACT

Provided is a battery module including: a battery cell assembly including a plurality of battery cells stacked with one another; end plates configured to cover front and rear portions of the battery cell assembly and to be coupled to the battery cell assembly at a side of each of the end plates; and a fixing holder configured to be mounted to a battery cell assembly at an opposite side of each of the end plates in order to at least partially cover the battery cell assembly, and to protrude from front and rear portions of the end plates.

10 Claims, 5 Drawing Sheets

(56) References Cited

U.S. PATENT DOCUMENTS

| 8,808,887 B2 | 8/2014 | Lim | |
|---|---|---|---|
| 9,012,063 B2 | 4/2015 | Kim | |
| 9,379,366 B2 | 6/2016 | Lim | |
| 2009/0239136 A1* | 9/2009 | Nagamine | H01M 2/1077 429/148 |
| 2012/0121950 A1 | 5/2012 | Lim | |
| 2014/0212731 A1* | 7/2014 | Lim | H01M 2/1077 429/151 |
| 2016/0003553 A1* | 1/2016 | Campbell | H01M 10/625 165/166 |

FOREIGN PATENT DOCUMENTS

| JP | 2014-186793 A | 10/2014 |
|---|---|---|
| KR | 10-1199217 B1 | 11/2012 |
| KR | 10-1219226 B1 | 1/2013 |
| KR | 10-1252950 B1 | 4/2013 |
| KR | 10-2014-0098439 A | 8/2014 |
| WO | WO 2013/031614 A1 | 3/2013 |
| WO | WO 2014/050109 A1 | 4/2014 |

* cited by examiner

BATTERY MODULE, BATTERY PACK INCLUDING BATTERY MODULE, AND AUTOMOBILE INCLUDING BATTERY PACK

TECHNICAL FIELD

The present disclosure relates to a battery module, a battery pack including the battery module, and a vehicle including the battery pack.

The present application claims priority to Korean Patent Application No. 10-2015-0116712 filed on Aug. 19, 2015 in the Republic of Korea, the disclosure of which is incorporated herein by reference.

BACKGROUND ART

Secondary batteries that are easily applicable according to product groups and have electric characteristics such as high energy density, etc. are being commonly applied in electric vehicles (EV) or hybrid electric vehicles (HEV) driven by an electric driving source, as well as portable devices. Secondary batteries have been highlighted as a new energy source that is echo-friendly and improves energy efficiency, due to its advantages that by-products according to usage of energy do not generate at all, in addition to a primary advantage, that is, noticeable reduction in using of fossil fuel.

Secondary batteries that are widely used may include lithium ion batteries, lithium polymer batteries, nickel cadmium batteries, nickel hydrogen batteries, nickel zinc batteries, etc. An operating voltage of a unit secondary battery, that is, a unit battery cell, is about 2.5V to 4.2V. Therefore, in a case where an output voltage greater than above is required, a battery pack may be configured by connecting a plurality of battery cells in series. Also, a battery pack may be configured by connecting a plurality of battery cells in parallel according to charging/discharging capacity required by the battery pack. Therefore, the number of battery cells included in the battery pack may vary depending on a required output voltage or charging/discharging capacity.

In addition, in a case where a battery pack is configured by connecting a plurality of battery cells in series/in parallel, a battery module including a plurality of battery cells is configured first, and the battery pack is generally configured by using a plurality of battery modules and adding other elements.

In a battery module, in battery cell assembly including a plurality of battery cells, the battery cells may be lithium polymer pouch type secondary battery cells. In a lithium polymer pouch type secondary battery, an electrolyte in the secondary battery is decomposed as a side reaction of repeated charging and discharging operations, and a gas may be generated. Here, deformation in an exterior of the battery cell due to the generated gas is referred to as a cell swelling effect.

A battery module according to the related art includes a battery cell assembly including a plurality of battery cells and end plates covering front and rear portions of the battery cell assembly. Here, the end plate is coupled to the battery cell assembly via four corners thereof by using screw members such as shoulder bolts, in order to fixedly support the battery module and to control the cell swelling effect. Here, the screw members such as the shoulder bolts provided at four corners of the end plate fixedly compress the battery cell assembly, and prevent expansion of the battery cell assembly when the cell swelling effect occurs.

However, in the battery module according to the related art, an additional space, in which the screw members such as the shoulder bolts are arranged, and a structure for the screw coupling are necessary due to the shoulder bolts provided at the four corners of the end plate, and thus, a size of the entire module increases due to the space occupied by the screw members such as the shoulder bolts and the screw coupling structure, and it hinders slim design of the battery module.

To address this, a battery module, in which the screw member such as the shoulder bolt is provided only at a side of the end plate and an additional fixing holder of a generally U-shaped clip type is provided at the other side of the end plate so as to fix the other side of the end plate with the battery cell assembly, has been suggested. That is, the end plate and the battery cell assembly are fixed to each other by using the screw member and the fixing holder.

In the battery module of the above structure, since the screw member such as the shoulder bolt is only provided at one side of the end plate, the screw member such as the shoulder bolt may be omitted from the other side of the end plate, and thus, increase in a volume of the battery module due to the screw member may be prevented.

However, in the battery module of the above structure, the fixing holder provided at the other side of the end plate is easily loosened when the cell swelling occurs, that is, the fixing holder may be deformed and fixing power of the fixing holder may be weakened. Accordingly, the fixing holder may not bear cell swelling pressure, and deformation of the exterior of the battery module may occur.

Therefore, it is necessary to find a method of providing a slimmer battery module capable of preventing expansion of a battery cell assembly and stably fixing the battery cell assembly.

DISCLOSURE

Technical Problem

The present disclosure is designed to solve the problems of the related art, and therefore the present disclosure is directed to providing a slimmer battery module capable of preventing expansion of a battery cell assembly and stably fixing the battery cell assembly, a battery pack including the battery module, and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a battery cell assembly including a plurality of battery cells stacked with one another; end plates configured to cover front and rear portions of the battery cell assembly at one side of each of the end plates via screws; and a fixing holder configured to be mounted at the other side of each of the end plates in order to at least partially cover the battery cell assembly, and to protrude from front and rear portions of the end plates.

The fixing holder may include: a supporter configured to support the battery cell assembly; end plate mounting portions extending from the supporter and configured to be mounted in the end plates; and protrusions extending from the end plate mounting portions and configured to protrude from the front and rear portions of the end plates.

A width of the supporter may be equal to at least half a width of the battery cell assembly.

The end plate mounting portions may be coupled to the end plates via snaps.

Each of the end plates may include at least one snap protrusion, and each of the end plate mounting portions may include at least one snap recess that is coupled to the at least one snap protrusion.

A plurality of the snap recesses are provided, and the plurality of snap recesses may be spaced apart a predetermined distance from one another.

Each of the end plate mounting portions may be bent at least once.

Each of the end plate mounting portions may include: a first mounting unit extending upward from the supporter; and a second mounting portion extending downward from the first mounting portion and connected to the protrusions.

The protrusions may be arranged perpendicularly to the end plate mounting portions.

The supporter, the end plate mounting portions, and the protrusions may be integrally formed with one another.

In one aspect of the present disclosure, there is also provided a battery pack including: at least one battery module according to the previous embodiments; and a pack case configured to package at least one battery module.

In one aspect of the present disclosure, there is also provided a vehicle including a battery pack according to the previous embodiment.

Advantageous Effects

According to various embodiments of the present disclosure, there are provided a slim type battery module capable of preventing expansion of a battery cell assembly and stably fixing the battery cell assembly, a battery pack including the battery module, and a vehicle including the battery pack.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
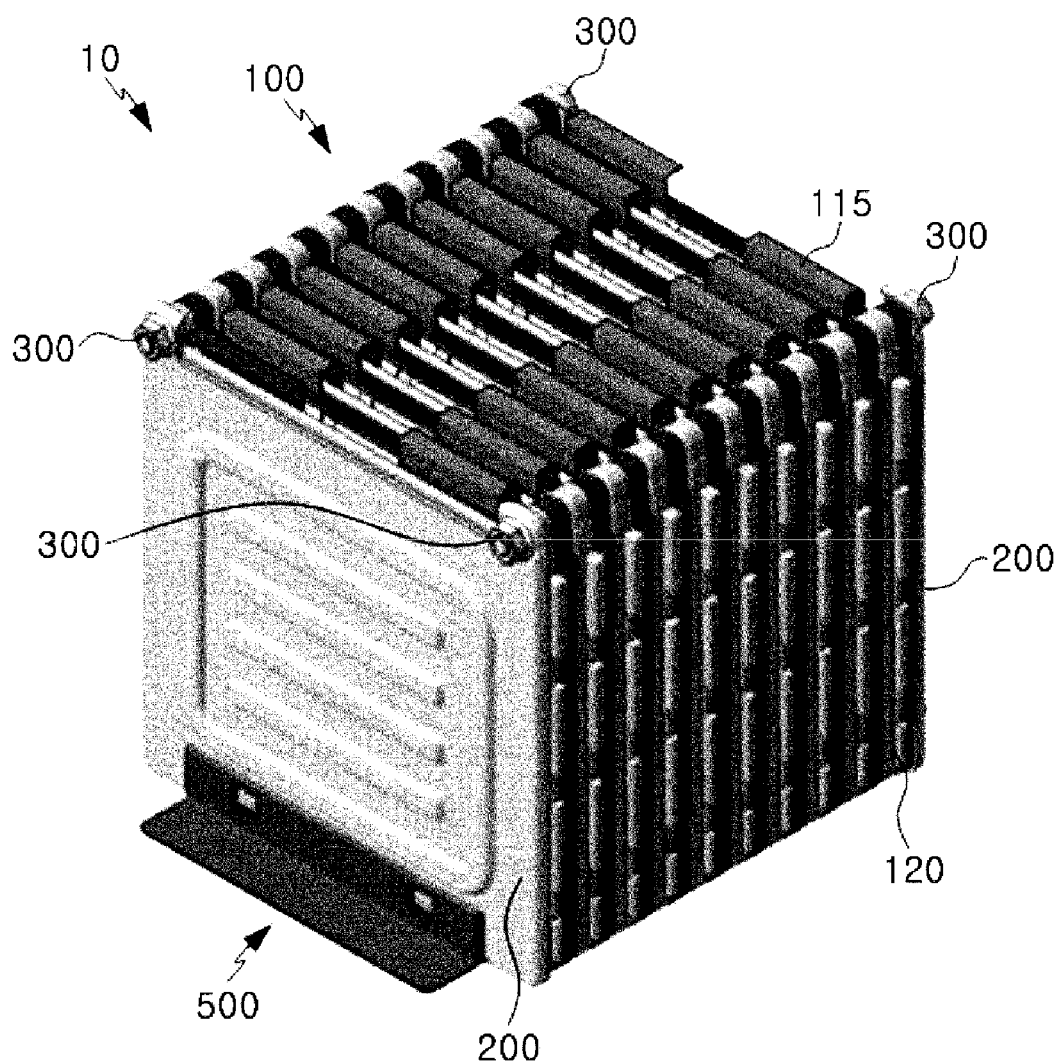
FIG. 1 is a schematic perspective view of a battery module according to an embodiment of the present disclosure.
Figure 2:
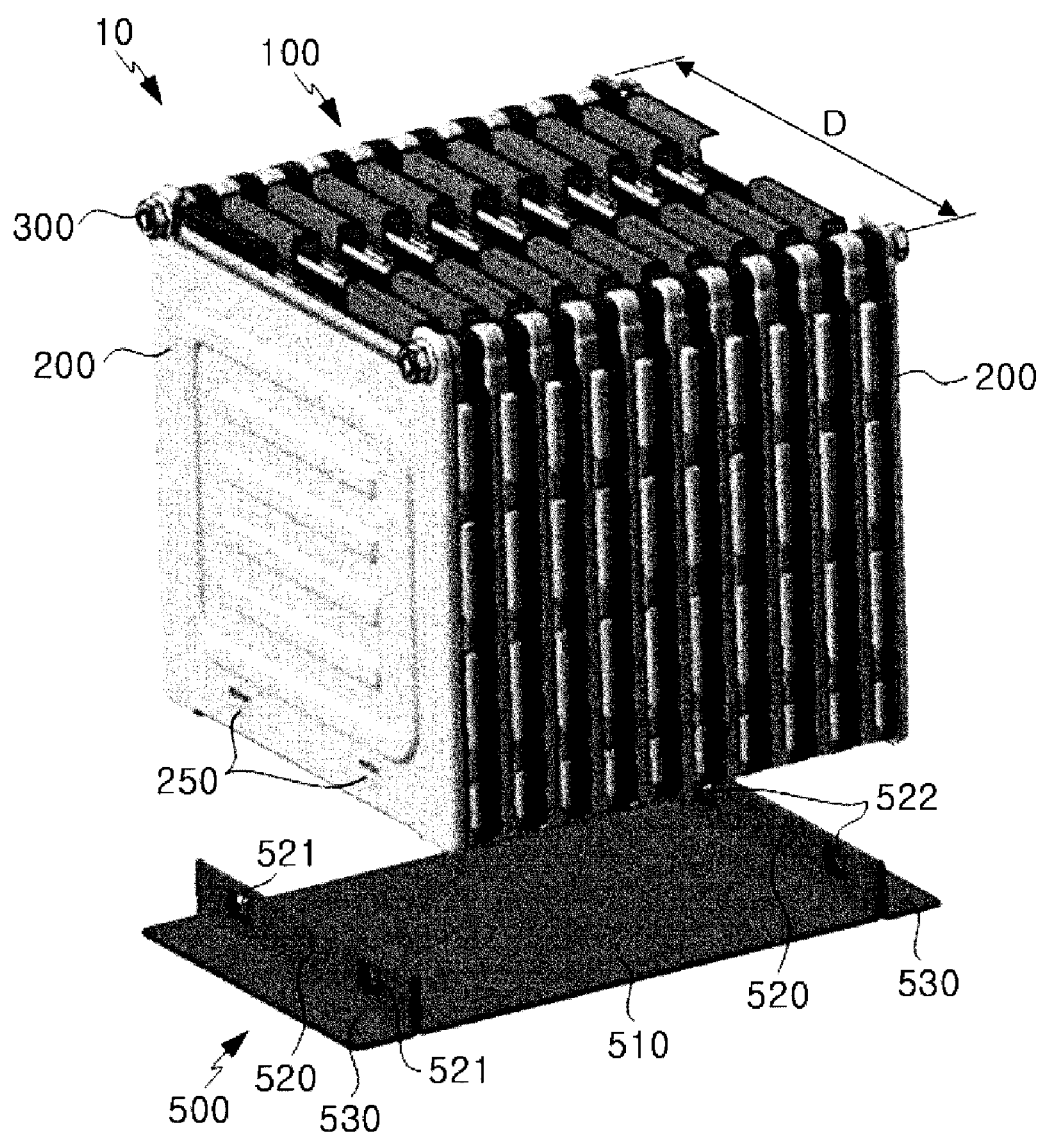
FIG. 2 is a schematically exploded perspective view of the battery module of FIG. 1.
Figure 3:
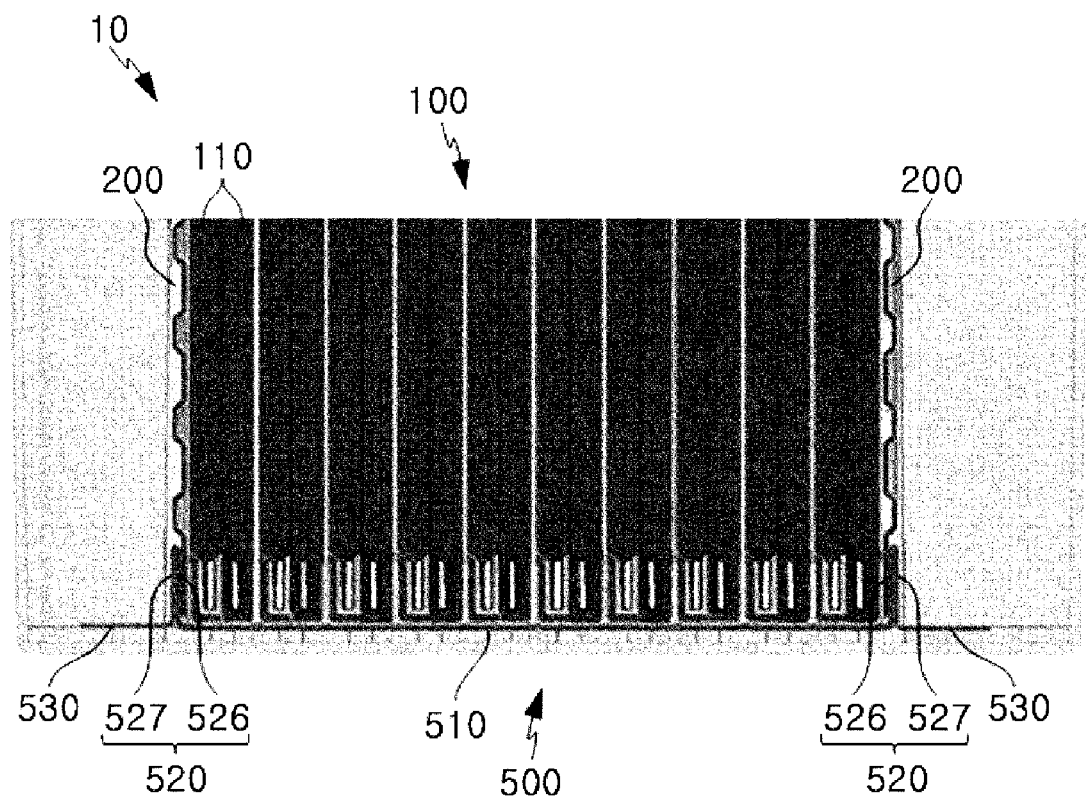
FIG. 3 is a schematic cross-sectional view of the battery module of FIG. 1.
Figure 4:
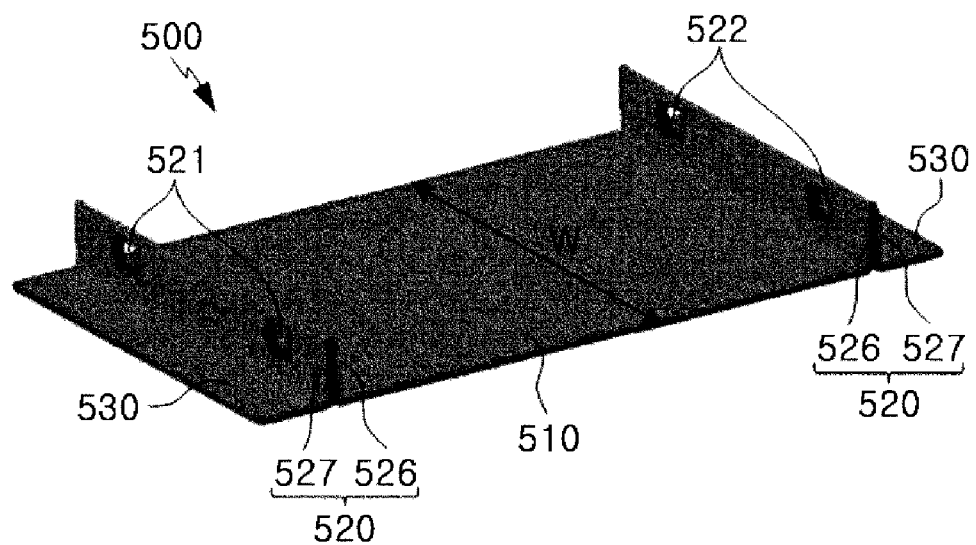
FIG. 4 is a schematic perspective view of a fixing holder in the battery module of FIG. 1.
Figure 5:
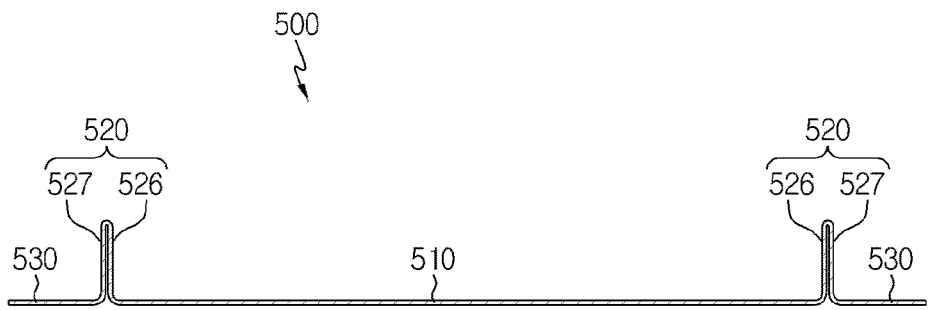
FIG. 5 is a schematic cross-sectional view of the fixing holder of FIG. 4.

FIG. 1 is a schematic perspective view of a battery module according to an embodiment of the present disclosure, FIG. 2 is a schematic exploded perspective view of the battery module of FIG. 1, FIG. 3 is a schematic cross-sectional view of the battery module of FIG. 1, FIG. 4 is a schematic perspective view of a fixing holder in the battery module of FIG. 1, and FIG. 5 is a schematic cross-sectional view of the fixing holder of FIG. 4.

Referring to FIGS. 1 to 5, a battery module 10 may include a battery cell assembly 10, end plates 200, and a fixing holder 500.

The battery cell assembly 100 may include battery cells 110 and cell cartridges 120.

A plurality of battery cells 110 may be provided, and may be stacked to be electrically connected to one another. Each of the battery cells 110 may include an electrode assembly, a battery case for accommodating the electrode assembly, and an electrode lead 115 exposed out of the battery case and connected to the electrode assembly. Here, the electrode lead 115 may include a cathode lead and an anode lead, and the cathode lead may be connected to a cathode plate of the electrode assembly and the anode lead may be connected to an anode plate of the electrode assembly.

Each of the battery cells 110 may be a pouch type secondary battery. The pouch type secondary battery may easily implement electric connections among the plurality of battery cells 110.

The cell cartridges 120 are provided to easily stack the plurality of battery cells 110, and may each hold at least one of the plurality of battery cells 110. A plurality of cell cartridges 120 may be provided, and the plurality of cell cartridges 120 are provided to be stacked to guide assembling of the battery cells 110.

Each of the cell cartridges 120 may hold two battery cells 110. Otherwise, each of the cell cartridges may have a structure for holding one battery cell, or a structure for holding three or more battery cells.

The end plates 200 support the battery cell assembly 100, and may be provided as a pair in order to cover front and rear portions of the battery cell assembly 100.

Each of the end plates 200 may be coupled to one side of the battery cell assembly 100 via screw members 300 such as a shoulder bolt. Here, there are a plurality of screw members 300 that penetrate through the battery cell assembly 100 at opposite sides in one edge of the end plate 200 in order to fixedly compress the battery cell assembly 100.

Each of the end plates 200 may include snap protrusions 250.

The snap protrusions 250 may be provided at the other side of the end plate 200 in order to be coupled to the fixing holder 500 via snap coupling operation. Here, one or more snap protrusions 250 may be provided. In the present embodiment, a plurality of snap protrusions 250 may be formed in each of the end plates 200, and the plurality of snap protrusions 250 may be spaced apart a predetermined distance from one another.

The fixing holder 500 is coupled to the other side of the end plate 200, partially covers a lower portion of the battery cell assembly 100, and may protrude from front and rear portions of the end plate 200. The fixing holder 500 may couple the end plate 200 to the battery cell assembly 100 at the other side of the end plate 200.

Accordingly, the screw members 300 for fixing the battery cell assembly 100 to the end plate 200 are not necessary at the other edge of the end plate 200. Therefore, an additional space in which the screw members 300 are arranged and a structure for coupling of the screw members 300 may be omitted from the other edge of the end plate 200. Accordingly, the battery module 10 according to the present embodiment may prevent increase in a volume of the battery module 10 due to the screw members 300 at the other edge of the end plate 200 by using the fixing holder 500, and accordingly, a slim type battery module 10 may be implemented.

The fixing holder 500 may include a supporter 510, end plate mounting portions 520, and protrusions 530. Here, the supporter 510, the end plate mounting portions 520, and the protrusions 530 may be integrally formed with one another, or may be provided as separate members to be coupled to one another. Hereinafter, it will be described that the above elements are formed integrally as one member taking into account manufacturing efficiency.

The supporter 510 is formed as a square plate for supporting the battery cell assembly 100 while at least partially covering the lower portion of the battery cell assembly 100.

The supporter 510 may have a width W that is at least equal to half a width D of the battery cell assembly or greater, so as to stably support the battery cell assembly 100. Accordingly, the supporter 510 may cover a significant part in the lower portion of the battery cell assembly 100, and thus, the lower portion of the battery cell assembly 100 may be held stably.

The end plate mounting portions 520 may respectively extend from opposite end portions of the supporter 510, and may be mounted respectively in the pair of end plates 200. In more detail, the end plate mounting portions 520 may extend upward from the opposite end portions of the supporter 510 in a direction perpendicular to the supporter 510, and may be mounted in the end plates 200 while covering the other edges of the end plates 200.

The end plate mounting portions 520 may be coupled to the end plates 200 via snaps. For the coupling via snaps, the end plate mounting portions 520 may include an elastic material. Since the fixing holder 500 may be provided as one element in the present embodiment, the fixing holder 500 may include the elastic material.

In addition, snap recesses 521 and 522 that are coupled to the snap protrusions 250 of the end plates 200 may be formed in the end plate mounting portions 520.

One or more snap recesses 521 and one or more snap recesses 522 may be provided to correspond to the snap protrusions 250. In the present embodiment, two snap protrusions 250 are provided in each of the end plates 200, that is, the total number of the snap protrusions 250 is four, and thus, the total number of the snap recesses 521 and 522 may be four.

The snap recesses 521 and 522 may include first snap recesses 521 and second snap recesses 522.

The first snap recesses 521 may be formed in the end plate mounting portion 520 that is arranged at a front portion of the fixing holder 500. The first snap recesses 521 may be provided as a pair and spaced apart a predetermined distance from each other, so that a coupling force of the end plate mounting portion 520 may be reinforced. The pair of first snap recesses 521 may be coupled to the snap protrusions 250 of the end plate 200 arranged on a front portion of the battery cell assembly 100.

The second snap recesses 522 may be formed in the end plate mounting portion 520 that is arranged at a rear portion of the fixing holder 500. The second snap recesses 522 may be provided as a pair and spaced apart a predetermined distance from each other, so that a coupling force of the end plate mounting portion 520 may be reinforced. The pair of second snap recesses 522 may be coupled to the snap protrusions 250 of the end plate 200 arranged on a rear portion of the battery cell assembly 100.

The pair of end plate mounting portions 520 are coupled to the end plates 200 through the snap coupling operation, and then stably hold the battery cell assembly 100 while compressing the end plates 200.

Each of the end plate mounting portions 520 may be bent at least once in order to reinforce rigidity thereof. Accordingly, the end plate mounting portions 520 may respectively include first mounting portions 526 and second mounting portions 527.

The first mounting portion 526 may extend upward from the opposite end portions of the supporter 510. The first snap recesses 521 or the second snap recesses 522 may be formed in the first mounting portions 526, and the first mounting portions 526 may contact the end plates 200 after the coupling of the end plate mounting portions 520 and the end plates 200.

The second mounting portions 527 extend downward from the first mounting portions 526, and may be connected to the protrusions 530 that will be described later. The second mounting portions 527 may be arranged in parallel with the first mounting portions 526 to form a double-fold structure with the first mounting portions 526. Accordingly, the end plate mounting portions 520 may further reinforce the rigidity of the fixing holder 500 via the double-fold structure.

The protrusions 530 may extend respectively from the end plate mounting portions 520, in particular, end portions of the second mounting portions 527, and may protrude from the front and rear portions of the end plates 200. In detail, the protrusions 530 may protrude to be perpendicular to the end plate mounting portions 520.

Due to the arrangement of the protrusions 530, the protrusions 530 may have a reaction force occurring against the force applied to the end plate mounting portions 520 during the cell swelling of the battery cells 110 in the battery cell assembly 100. The reaction force may attenuate the force applied to the end plate mounting portions 520 in the cell swelling of the battery cells 110. Accordingly, when the cell swelling effect occurs in the battery cells 110, the end plate mounting portions 520 may not be separated from the end plates 200, for example, occurring of a gap between the end plate mounting portions 520 and the end plates 200 may be prevented.

Therefore, since the fixing holder 500 may bear the cell swelling pressure when the cell swelling effect occurs, the fixing holder 500 may not be deformed and the fixing holder 500 may maintain the fixing power.

Therefore, the fixing holder 500 according to the present embodiment may attenuate the force generated due to the cell swelling pressure by using the reaction force of the protrusions 530 in order to prevent expansion of the battery cell assembly 100, and at the same time, may stably hold the battery cell assembly 100 to prevent deformation in the exterior of the battery module 10.

Hereinafter, operations of the fixing holder 500 regarding the reaction force during the cell swelling of the battery module 10 will be described in detail.

Figure 6:
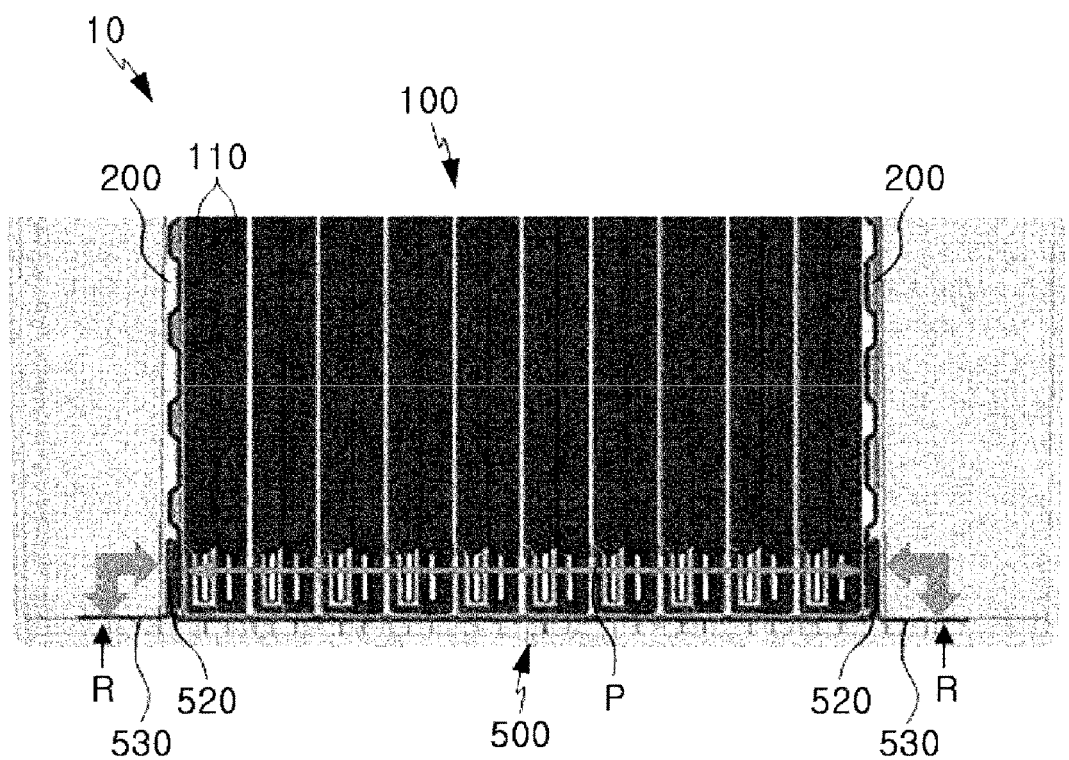
FIG. 6 is a diagram illustrating an operation of a fixing holder during cell swelling of the battery module of FIG. 1.

FIG. 6 is a diagram illustrating an operation of a fixing holder during cell swelling of the battery module of FIG. 1.

Referring to FIG. 6, when the cell swelling occurs in the battery module 10, a power P caused by the cell swelling pressure of the plurality of battery cells 110 in the battery cell assembly 100 may be applied to the end plate mounting portions 520 of the fixing holder 500 in a horizontal direction.

Here, a reaction force R may be applied to the protrusions 530 in the perpendicular direction, against the cell swelling pressure. Here, the reaction force R from the protrusions 530 may effectively attenuate the power P caused by the cell swelling pressure.

As described above, according to the present embodiment, the deformation of the fixing holder 500 during the cell swelling may be prevented by the reaction force R applied to the protrusions 530 as described above, and thus, the fixing holder 500 may stably fix the battery cell assembly 100 while preventing expansion of the battery cell assembly 100 in order to prevent deformation in the exterior of the battery module 10.

Figure 7:
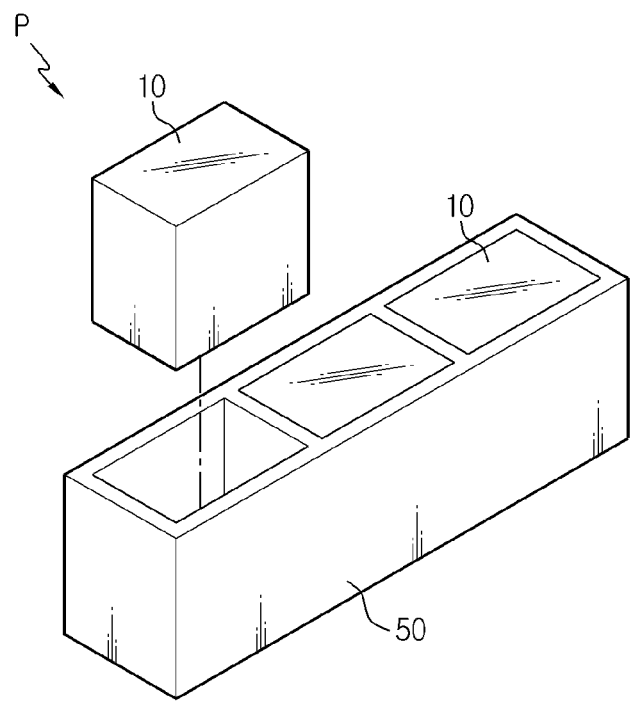
FIG. 7 is a diagram of a battery pack according to an embodiment of the present disclosure.

FIG. 7 is a diagram of a battery pack according to an embodiment of the present disclosure.

Referring to FIG. 7, a battery pack P may include at least one battery module 10 according to the previous embodiment and a pack case 50 for packaging the at least one battery module 10.

The battery pack P may be included in a vehicle a driving source of the vehicle. As an example, the battery pack P may be included in an electric vehicle, a hybrid electric vehicle, and other vehicles capable of using the battery pack P as a driving source. Also, the battery pack P may be included in other devices, mechanisms, and equipment such as an energy storage system using a secondary battery, as well as the above vehicles.

As described above, the battery pack P according to the present embodiment and devices, mechanisms, and equipment including the battery pack P, e.g., the vehicle, include the battery module 10 described above, and thus, the battery pack P and the vehicle having the advantages of the battery module 10 may be implemented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:
a battery cell assembly comprising a plurality of battery cells stacked with one another;
end plates configured to cover front and rear portions of the battery cell assembly, wherein a first side of each end plate is connected to the battery cell assembly via screws; and
a fixing holder configured to be mounted at a second side of each of the end plates opposite the first side in order to at least partially cover the battery cell assembly, and to protrude from front and rear portions of the end plates, the fixing holder including:
a supporter configured to support the battery cell assembly; and
end plate mounting portions extending from the supporter and configured to be mounted to the end plates,
wherein each of the end plate mounting portions is bent at least once to contact itself,
wherein the fixing holder comprises protrusions extending from the end plate mounting portions and configured to protrude from the front and rear portions of the end plates, and
wherein the end plate mounting portions are coupled to the end plates via snaps.

2. The battery module of claim 1 wherein a width of the supporter is equal to at least half a width of the battery cell assembly.

3. The battery module of claim 1 wherein each of the end plates includes at least one snap protrusion, and each of the end plate mounting portions includes at least one snap recess that is coupled to the at least one snap protrusion.

4. The battery module of claim 3, wherein a plurality of the snap recesses are provided, and the plurality of snap recesses are spaced apart a predetermined distance from one another.

5. The battery module of claim 1 wherein each of the end plate mounting portions comprises:
a first mounting portion extending upward from the supporter; and
a second mounting portion extending downward from the first mounting portion and connected to the protrusions.

6. The battery module of claim 1, wherein the protrusions are arranged perpendicularly to the end plate mounting portions.

7. The battery module of claim 1, wherein the supporter, the end plate mounting portions, and the protrusions are integrally formed with one another.

8. A battery pack comprising:
the at least one battery module according to claim 1; and
a pack case configured to package the at least one battery module.

9. A vehicle comprising a battery pack according to claim 8.

10. The battery module of claim 1, wherein the supporter, the end plate mounting portions, and the protrusions are provided as a monolithic body.

* * * * *